US011884301B2

(12) United States Patent
Yokoyama et al.

(10) Patent No.: US 11,884,301 B2
(45) Date of Patent: Jan. 30, 2024

(54) TRAVEL PLAN INFORMATION DISTRIBUTION SYSTEM (71) Applicant: Mitsubishi Electric Corporation, Tokyo (JP)

(72) Inventors: Kengo Yokoyama, Tokyo (JP); Yuji Igarashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 668 days.

(21) Appl. No.: 16/982,797

(22) PCT Filed: Jun. 8, 2018

(86) PCT No.: PCT/JP2018/022024
§ 371 (c)(1),
(2) Date: Sep. 21, 2020

(87) PCT Pub. No.: WO2019/234915
PCT Pub. Date: Dec. 12, 2019

(65) Prior Publication Data
US 2021/0001892 A1 Jan. 7, 2021

(51) Int. Cl.
*B60W 60/00* (2020.01)
*H04W 4/46* (2018.01)
(Continued)

(52) U.S. Cl.
CPC ..... *B60W 60/0027* (2020.02); *G01C 21/3605* (2013.01); *G06V 20/588* (2022.01); *H04W 4/46* (2018.02); *B60W 2554/4045* (2020.02)

(58) Field of Classification Search
CPC ...... B60W 60/0027; B60W 2554/4045; G01C 21/3605; G06V 20/588; H04W 4/46;
(Continued)

(56) References Cited

U.S. PATENT DOCUMENTS 10,451,730 B2 * 10/2019 Talamonti ............ G08G 1/205
2008/0162027 A1 * 7/2008 Murphy ............... G05D 1/0274
701/1
(Continued)

FOREIGN PATENT DOCUMENTS

JP 2008-168827 A 7/2008
JP 2016-99713 A 5/2016
(Continued)

OTHER PUBLICATIONS

Google Patents English translation of JP 2017010463, Jan. 12, 2017, Kenichiro Imai (Year: 2017).*
(Continued)

Primary Examiner — Abby Y Lin
Assistant Examiner — Danielle Marie Jackson
(74) Attorney, Agent, or Firm — Sughrue Mion, PLLC; Richard C. Turner (57) ABSTRACT With an object of notifying a peripheral vehicle or a person of a travel plan of an own vehicle at an appropriate timing, and providing a safe automatic driving system, a travel plan information distribution system is characterized by including a travel plan information compilation unit that, based on information output by a positional information and frontal road shape information acquisition unit and a sensor information acquisition unit, compiles travel plan information including a travel plan category and a time at which travel is to be started or a position from which a travel plan is to be started, a wireless communication device that transmits travel plan information to a peripheral vehicle, and a travel plan information distribution control unit that selects and outputs necessary details of travel plan information at a safe and necessary timing.

14 Claims, 8 Drawing Sheets (51) Int. Cl.
*G01C 21/36* (2006.01)
*G06V 20/56* (2022.01)

(58) Field of Classification Search
CPC ....... H04W 4/024; G08G 1/09; G08G 1/0968; G08G 1/16
See application file for complete search history.

(56) References Cited

U.S. PATENT DOCUMENTS

| | | |
|---|---|---|
| 2016/0139598 A1 | 5/2016 | Ichikawa et al. |
| 2018/0061236 A1 | 3/2018 | Yamamoto |
| 2018/0079419 A1 | 3/2018 | Yamamoto |
| 2019/0043363 A1* | 2/2019 | Morimura ............. B60Q 1/543 |
| 2019/0202476 A1* | 7/2019 | Tao .................... B60W 30/095 |
| 2019/0225224 A1* | 7/2019 | Hashimoto ........... B60W 50/10 |
| 2019/0344703 A1* | 11/2019 | Morimura ............... B60Q 1/46 |
| 2020/0269747 A1* | 8/2020 | Kusayanagi ............ B60Q 1/34 |

FOREIGN PATENT DOCUMENTS

| | | |
|---|---|---|
| JP | 2017-010463 A | 1/2017 |
| JP | 6206120 B2 | 10/2017 |
| JP | 2018-106438 A | 7/2018 |
| WO | 2016/147622 A1 | 9/2016 |
| WO | 2016/147623 A1 | 9/2016 |

OTHER PUBLICATIONS

Communication dated Jan. 26, 2022, issued by the State Intellectual Property Office if the P.R.C. in application No. 201880094267.8.
Office Action dated Jun. 1, 2021 from the Japanese Patent Office in JP Patent Application No. 2020-523954.
International Search Report for PCT/JP2018/022024 dated Sep. 18, 2018 [PCT/ISA/210].

* cited by examiner

| PLAN NUMBER | SCHEDULED PLAN STARTING TIME | SCHEDULED PLAN STARTING POSITION | TRAVEL PLAN CATEGORY |
|---|---|---|---|
| 1 | 10:00:00 (CURRENT TIME) | — | CRUISING (TRAVELING AT LEGAL SPEED) |
| 2 | 10:01:00 | 1,000m BEFORE LEFT TURN POSITION | START LANE CHANGE TO LEFT-HAND LANE |
| 3 | 10:02:00 | 500m BEFORE LEFT TURN POSITION | START DECELERATION FOR LEFT TURN |
| 4 | 10:02:30 | LEFT TURN POSITION | START LEFT TURN |

TRAVEL PLAN INFORMATION DISTRIBUTION SYSTEM

CROSS REFERENCE TO RELATED APPLICATIONS

This application is a National Stage of International Application No. PCT/JP2018/022024 filed Jun. 8, 2018.

TECHNICAL FIELD

The present application relates to a travel plan information distribution system in a vehicle.

BACKGROUND ART

Cases wherein an autonomous vehicle and a non-autonomous vehicle driven by a person travel mixed together on a road have increased in recent years.

In such cases, to what extent the autonomous vehicle and the non-autonomous vehicle can operate safely and smoothly, without interfering in each other's travel, is an issue.

Because of this, there is technology such that a speed and a position of an autonomous vehicle or a non-autonomous vehicle are acquired using road communication infrastructure installed on a road or inter-vehicle communication, and traveling speed information such that an inter-vehicle distance becomes a reference inter-vehicle distance in a convergence section is distributed to each vehicle (Patent Literature 1).

CITATION LIST

Patent Literature

Patent Literature 1: Japanese Patent No. 6,206,120

SUMMARY OF INVENTION

Technical Problem

However, although an autonomous vehicle changes behavior such as changing lane, accelerating, or decelerating in accordance with a peripheral situation, a peripheral non-autonomous vehicle or autonomous vehicle cannot take responsive action with respect to the behavior change.

For example, even when an autonomous vehicle notifies a peripheral autonomous vehicle in advance of an intention to change lane three seconds later using inter-vehicle communication, acquires permission from the peripheral autonomous vehicle, and begins to change lane, a non-autonomous vehicle in the periphery cannot be aware of this series of processes. Also, when considering a time needed for recognition and determination by a driver of a non-autonomous vehicle, a time of three seconds is short, because of which, even when an autonomous vehicle notifies the periphery in advance of an intention to change lane, it is difficult for a non-autonomous vehicle to respond.

The present application discloses technology for resolving the heretofore described kind of problem, and has an object of providing a travel plan of an own vehicle to a peripheral vehicle at a timing such that road traffic can move safely and smoothly.

Solution to Problem

A travel plan information distribution system disclosed in the present application is a travel plan information distribution system including a travel plan information distribution device that has a positional information and frontal road shape information acquisition unit that acquires positional information and frontal road shape information of a vehicle, a sensor information acquisition unit that acquires information output from a vehicle-mounted sensor group, a travel plan information compilation unit that compiles travel plan information based on information output by the positional information and frontal road shape information acquisition unit and the sensor information acquisition unit, a travel plan information notification unit that supplies information output by the travel plan information compilation unit to a travel plan information display unit, where the information is displayed, a wireless communication device that carries out inter-vehicle communication with a peripheral vehicle, and a travel plan information distribution control unit that controls an operation of each unit at a predetermined timing, wherein, when there is a change in travel plan information compiled by the travel plan information compilation unit for a time from a current time until a certain time ahead, the travel plan information distribution control unit outputs the travel plan information after the change to the wireless communication device, thereby notifying a peripheral vehicle, a time before a travel plan starting time within which the peripheral vehicle or a driver can respond.

Advantageous Effects of Invention

According to the travel plan information distribution system disclosed in the present application, a travel plan information distribution timing and a distribution cycle can be a timing and a cycle such that a peripheral vehicle can recognize and respond to an own vehicle travel plan, in accordance with details of the own vehicle travel plan, and driving of a vehicle can be caused to be carried out more safely.

DESCRIPTION OF EMBODIMENTS

First Embodiment

Figure 1:
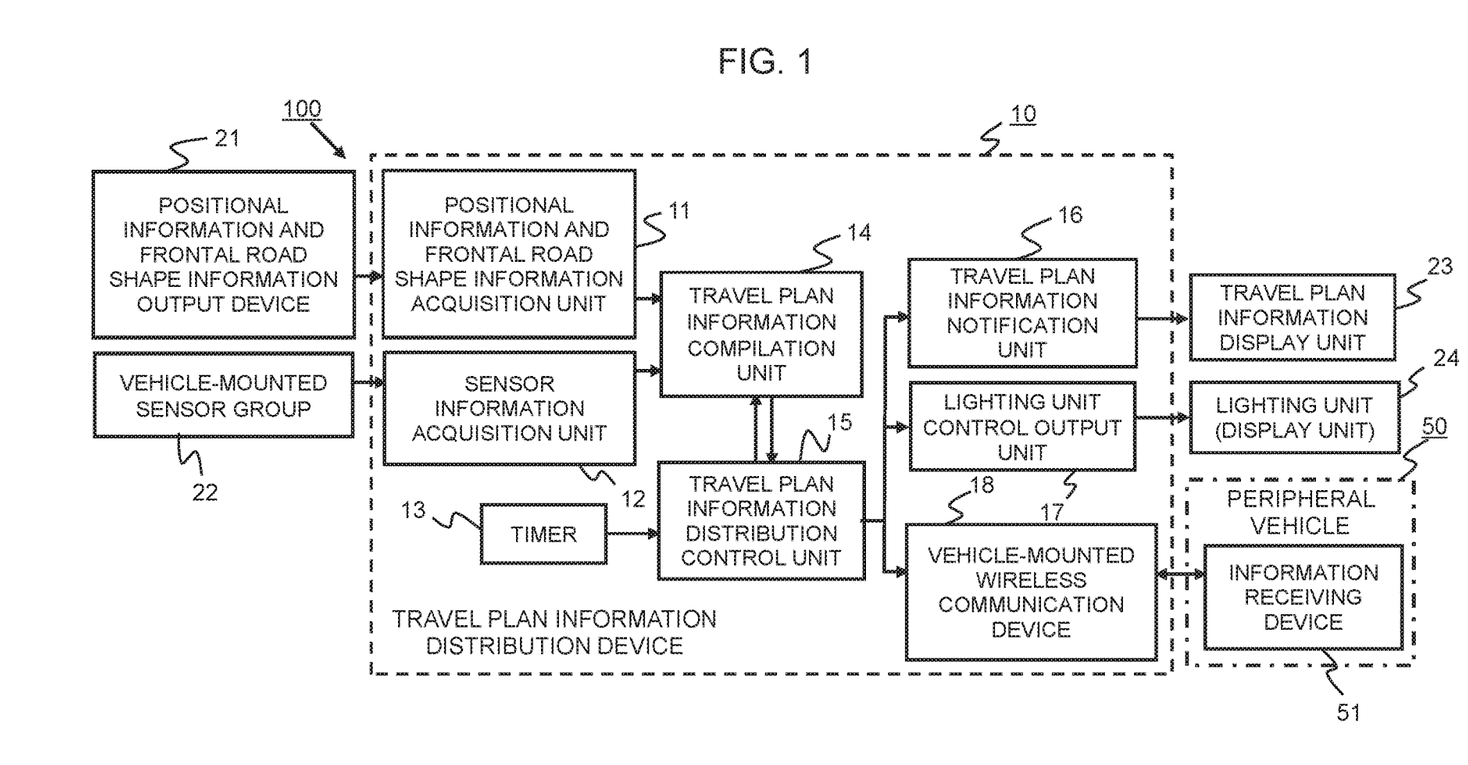
FIG. 1 is a block diagram showing an overall configuration of a travel plan information distribution system according to a first embodiment.

FIG. 1 is a block diagram showing an overall configuration of a travel plan information distribution system according to a first embodiment.

In FIG. 1, a travel plan information distribution system 100 is configured of a travel plan information distribution device 10, which compiles and distributes travel plan information of an own vehicle, and an information receiving device 51 of a peripheral vehicle 50 that receives travel plan information that is an output of the travel plan information distribution device 10.

Herein, the travel plan information distribution device 10 includes a positional information and frontal road shape information acquisition unit 11, which acquires information from a positional information and frontal road shape information output device 21 that, like an advanced driver-assistance system (ADASIS), outputs frontal road map information (a road shape and road network information indicating a prescribed speed and a permitted direction of travel) together with information regarding an own vehicle position on the road map, a sensor information acquisition unit 12, which acquires information output from a vehicle-mounted sensor group 22 that detects an own vehicle traveling speed, a yaw rate, a peripheral vehicle, a person, and a road shape (a lane marker, a road surface) within a 30 to 100 m periphery of the own vehicle, and a road shape or a feature such as a road sign, traffic lights, or a road shoulder edge, a timer 13, which outputs current time information and determines a reference timing of an operation, a travel plan information compilation unit 14, which compiles travel plan information based on information output by the positional information and frontal road shape information acquisition unit 11 and the sensor information acquisition unit 12, and a travel plan information distribution control unit 15, which controls operations of the travel plan information distribution device 10, such as that of the travel plan information compilation unit 14.

Furthermore, the travel plan information distribution device 10 includes a travel plan information notification unit 16, which supplies information output by the travel plan information compilation unit 14 to a travel plan information display unit 23 of the own vehicle, where the information is displayed, a lighting unit control output unit 17, which causes a lighting unit 24 of the own vehicle to drive based on information output by the travel plan information compilation unit 14, and a wireless communication device 18, which carries out road-to-vehicle or inter-vehicle communication.

Figure 2:
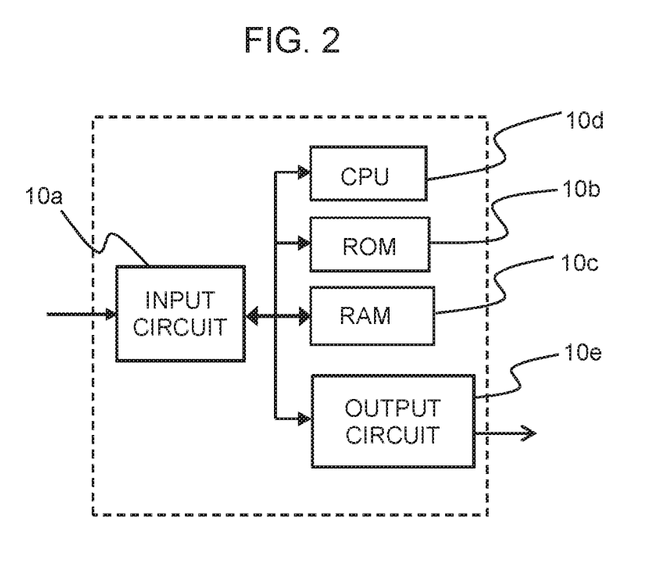
FIG. 2 is a block diagram showing a hardware configuration of a travel plan information distribution device in FIG. 1.

As shown in a hardware configuration example in FIG. 2, this kind of travel plan information distribution device 10 is configured to include an input circuit 10a that inputs various kinds of information, a storage device (ROM) 10b in which a control program is stored, a volatile storage device (RAM) 10c in which data are temporarily saved, a central processing unit (CPU) 10d that executes a computing process based on various kinds of data, and an output circuit 10e that outputs a computing process result, wherein the central processing unit (CPU) 10d executes a process based on a program input from the storage device (ROM) 10b.

Next, a specific configuration of each unit will be described.

Although the positional information and frontal road shape information output device 21 is assumed to be configured of an advanced driver-assistance system (ADASIS), the positional information and frontal road shape information output device 21 may be configured of a GPS (global positioning system).

Also, although the vehicle-mounted sensor group 22 is configured to include a vehicle speed sensor, a gyro sensor, a camera sensor, a millimeter-wave sensor, an ultrasonic sensor, a LiDAR sensor, and the like, it is not always the case that all of the sensors are necessary. Furthermore, the wireless communication device 18 is configured to utilize wireless communication using a bandwidth of 700 to 760 MHz, near-infrared communication, IEEE802.11p (a wireless LAN standard), Wi-Fi (a wireless LAN standard), LTE (long term evolution), or LTE-V2X.

Also, the travel plan information display unit 23 displays travel plan information to a driver or a passenger of the own vehicle using an image or a voice, and is realized by a display device or a speaker.

Figure 3:
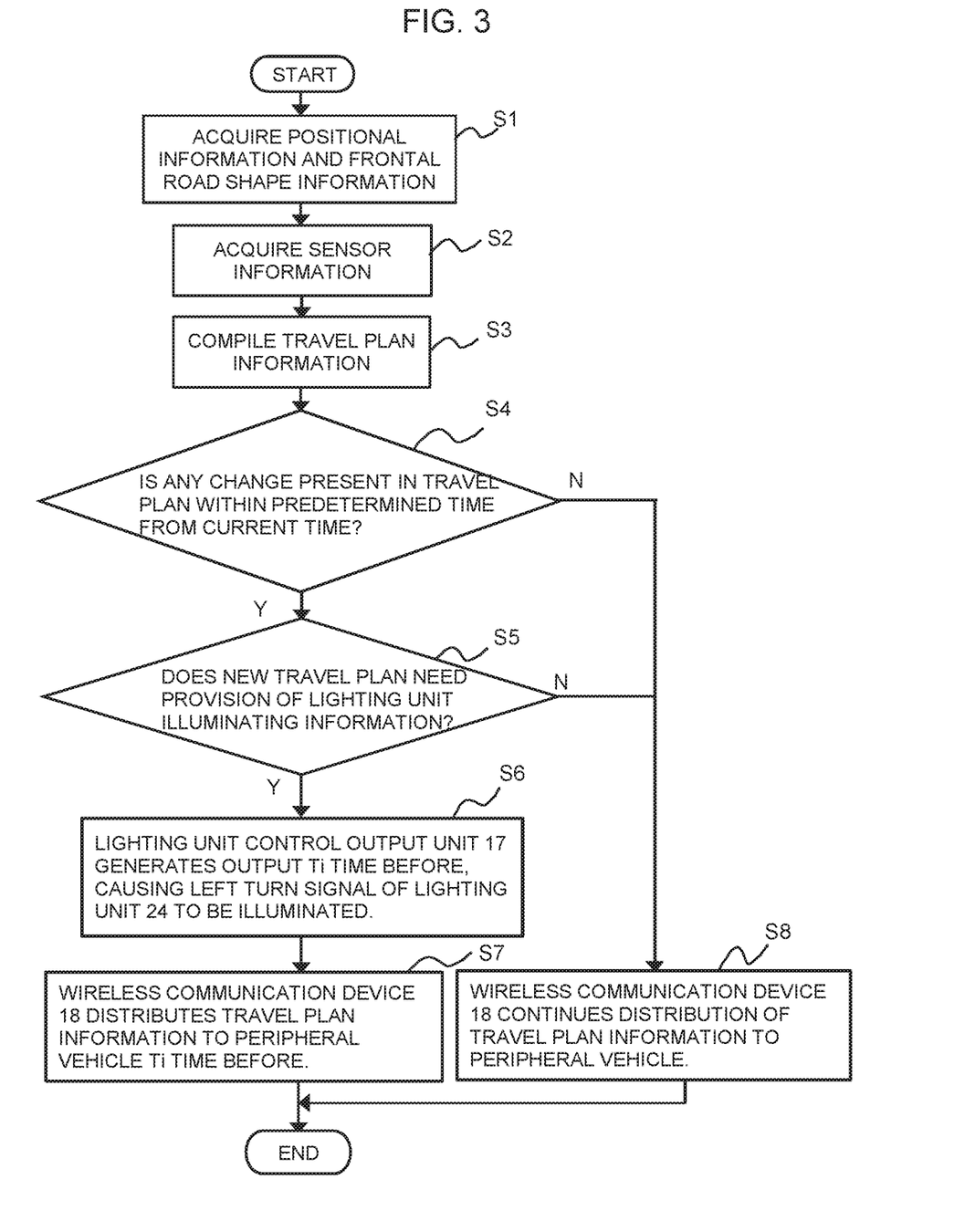
FIG. 3 is a flowchart for describing a process of the travel plan information distribution device according to the first embodiment.

Next, an operation in the first embodiment will be described, using a flowchart shown in FIG. 3.

Firstly, the travel plan information distribution device 10 determines an operation timing based on a processing program of the travel plan information distribution control unit 15, acquires positional information and frontal road shape information from the positional information and frontal road shape information output device 21 (step S1), and furthermore, acquires vehicle operation information needed for control from the vehicle-mounted sensor group 22 (step S2).

Next, in step S3, the travel plan information compilation unit 14 compiles own vehicle travel plan information for between several seconds and several tens of seconds ahead, based on the acquired positional information and frontal road shape information and on the vehicle operation information.

Herein, a time at which the travel is to be started (a scheduled plan starting time), a position from which the travel plan is to start (a scheduled plan starting position), and a travel plan category (going straight ahead at a constant speed, accelerating, decelerating, changing lane to the right, changing lane to the left, turning right, turning left, stopping, making a U-turn, stopping suddenly, taking refuge on the left-hand road shoulder, or taking refuge on the right-hand road shoulder), are included in the travel plan information.

Figure 4:
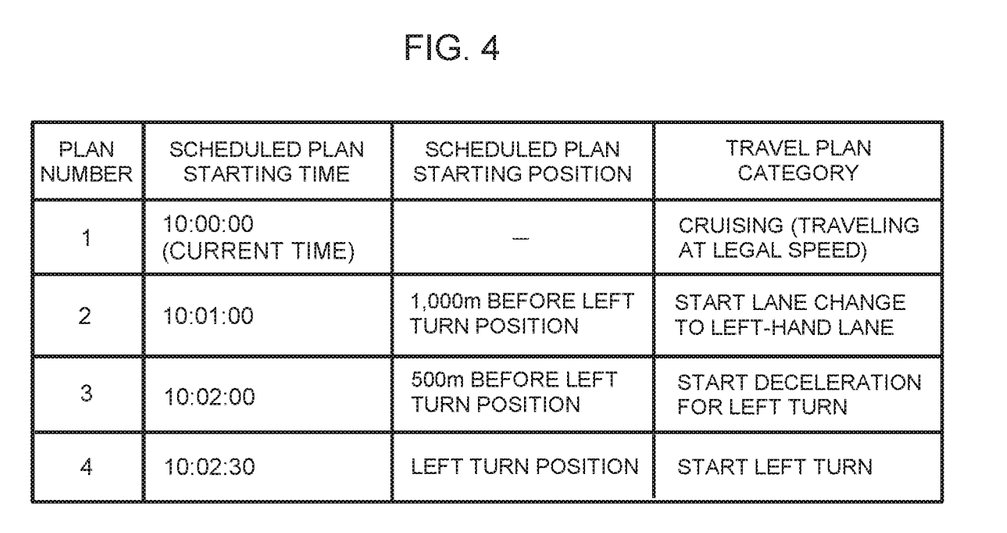
FIG. 4 is a drawing for describing a configuration of travel plan information according to the first embodiment.

FIG. 4 is a drawing showing an example of this kind of travel plan information.

In the drawing, the scheduled plan starting time is expressed as a local time format, such as "10:00:00", obtained using a GPS or a timer, but the scheduled plan starting time may be expressed as a relative time such as 500 milliseconds from when the travel plan information is distributed. Also, the scheduled plan starting position may be represented by GPS latitude and longitude, or may be represented by a relative position on a map (for example, a position on a lane link).

That is, the travel plan information is configured of the following (information 1) to (information 4). Note that in this embodiment, it is sufficient that there is information indicating a travel plan starting position and a travel plan category, because of which the travel plan information may be configured of at least (information 1) and (information 3), (information 2) and (information 3), or (information 3) and (information 4).

Information 1: the time at which travel represented by the travel plan category is to be started (the scheduled plan starting time).

Information 2: the position from which the travel plan is to be started (the scheduled plan starting position).

Information 3: the travel plan category (going straight ahead at a constant speed, accelerating, decelerating, changing lane to the right, changing lane to the left, turning right, turning left, stopping, making a U-turn, stopping suddenly, taking refuge on the left-hand road shoulder, or taking refuge on the right-hand road shoulder).

Information 4: scheduled travel path information (information representing future times and a positional path of an autonomous vehicle).

Next, in step S4, the travel plan information distribution control unit 15, based on the travel plan information compiled by the travel plan information compilation unit 14, confirms whether or not there is a change in the travel plan within a predetermined time from the current time. Herein, "within a predetermined time" means within a time Ti in which the own vehicle or a peripheral vehicle can respond to the own vehicle travel plan information. For example, when a time needed to notify a peripheral vehicle is Ta, a time available for a peripheral vehicle to act is Tb, a time needed to notify the own vehicle is Tc, and a time available for the own vehicle to suspend the travel plan is Td, the predetermined time is a time determined by Ti=Ta+Tb+Tc+Td.

When there is a change in the travel plan within the predetermined time in step S4 (for example, when a current travel plan is to cruise and a new travel plan is to change lane to a left-hand lane, as shown in FIG. 4), the travel plan information distribution device 10 shifts to step S5, and determines whether the new travel plan necessitates providing a peripheral vehicle with lighting unit illuminating information. When it is determined in step S5 that information needs to be provided (Y), the travel plan information distribution device 10 shifts to step S6, and the travel plan information distribution control unit 15 outputs lighting unit control information (a start of a left turn signal illumination) to the lighting unit control output unit 17 at a point that is the time Ti (=Ta+Tb+Tc+Td) before the scheduled starting time of the new travel plan, causing a left turn signal of the lighting unit 24 to be illuminated. Subsequently, in step S7, the travel plan information distribution control unit 15 distributes the travel plan information to the information receiving device 51 of the peripheral vehicle 50 via the wireless communication device 18, causing a driving operation of the peripheral vehicle 50 to adapt.

Also, when there is no change in the travel plan in step S4 (N), and furthermore, when it is determined in the following step S5 that there is no need to provide a peripheral vehicle with lighting unit illuminating information (N) even though there is a change in the travel plan in step S4, the travel plan information distribution device 10 shifts to step S8, and the travel plan information distribution control unit 15 causes transmission to be continued by outputting the travel plan information compiled in step S3 to the vehicle-mounted wireless communication device 18 in a normal-time transmission cycle (for example, a 100 millisecond cycle), and subsequently ends the series of processes.

The determination in step S5 of whether or not lighting unit illuminating information needs to be provided can be caused to be carried out by illumination pattern information (left lighting unit illumination, right lighting unit illumination, brake light illumination, and the like) for the lighting unit 24 indicating an illumination pattern of the lighting unit 24 that corresponds to the travel plan category (a constant speed, accelerating, decelerating, changing lane to the right, changing lane to the left, turning right, turning left, stopping, making a U-turn, stopping suddenly, taking refuge on the left-hand road shoulder, or taking refuge on the right-hand road shoulder) of the travel plan information being set in advance in the travel plan information distribution control unit 15.

As heretofore described, when the travel plan changes, the own vehicle or a peripheral vehicle, and a driver or a passenger of the own vehicle, can be notified in advance of travel plan information relating to the new travel plan a time calculated from a total time of the time needed to notify a peripheral vehicle or a driver of the new travel plan information (Ta), the time needed for the peripheral vehicle to respond to the new travel plan (Tb), the time needed to notify the driver or a passenger of the own vehicle of the new travel plan (Tc), and the time needed for the driver to carry out an operation suspending the new travel plan (Td) before the time at which the new travel plan (changing lane to the left-hand lane) is started, because of which notification of the new travel plan can be carried out in advance at a safe timing, and automatic driving of a vehicle can be realized more safely.

In the embodiment, a configuration is such that control causing the lighting unit 24 to be illuminated is carried out when there is a change in the travel plan information, but a configuration can be such that information indicating either a distance or a time from the current time to a left turn starting position (travel plan execution level information) is included as lighting unit control information.

For example, when the travel plan execution level information has the following three levels:

level 1: 15 seconds or more before a scheduled travel plan time;

level 2: 10 to 15 seconds before the scheduled travel plan time; and level 3: within 10 seconds from the scheduled travel plan time, a configuration may be such that the lighting unit 24 is caused to be illuminated once in 1.0 seconds at level 1, once in 0.75 seconds at level 2, and once in 0.5 seconds at level 3.

In this way, the own vehicle or a peripheral vehicle can be caused to recognize the timing at which the own vehicle is to start the lane change from visual information (an interval at which the lighting unit 24 is illuminated), because of which automatic driving of a vehicle can be realized more safely.

The driver or a passenger may be notified by an icon display or a voice display using the travel plan information display unit 23 instead of the lighting unit 24.

Second Embodiment

In the first embodiment, a configuration is such that the travel plan information distribution device 10 starts an illumination of the lighting unit 24 with respect to the own vehicle or a peripheral vehicle at a timing wherein a travel plan can be more safely implemented, whereby the travel plan can be safely implemented, but in a second embodiment, a configuration is such that travel plan information is distributed at a safer timing.

Figure 5:
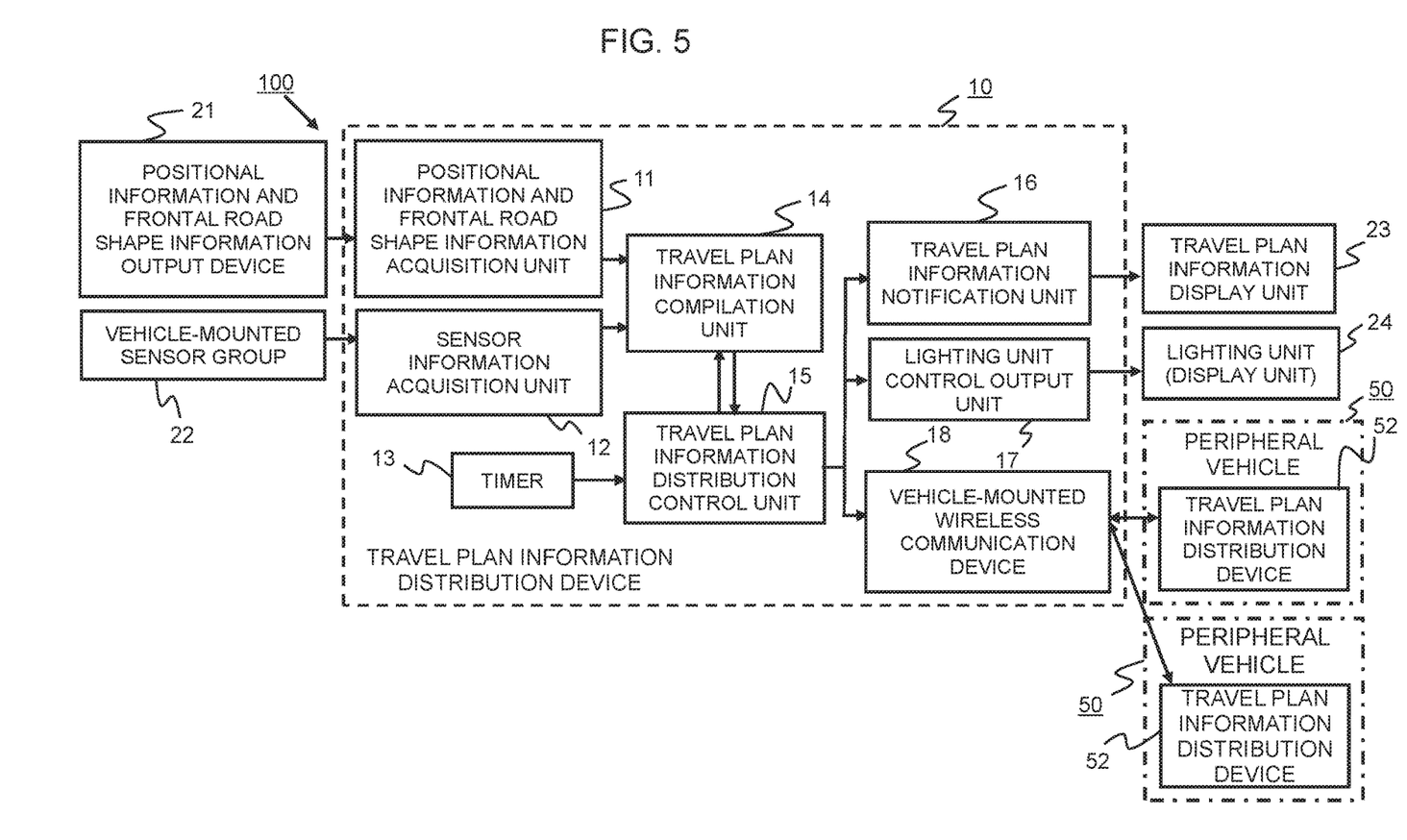
FIG. 5 is a block diagram showing an overall configuration of a travel plan information distribution system according to a second embodiment.

FIG. 5 is a block diagram showing an overall configuration of a travel plan information distribution system according to the second embodiment.

In the diagram, the travel plan information distribution system 100 is configured in such a way that in the travel plan information distribution device 10, which compiles and distributes own vehicle travel plan information, the wireless communication device 18 includes a function of receiving travel plan information from a travel plan information distribution device 52 in the peripheral vehicle 50, and travel plan information received by the wireless communication device 18 is selected by the travel plan information distribution control unit 15, output to the travel plan information notification unit 16, and caused to be displayed in the travel plan information display unit 23.

As other configurations are the same as in the first embodiment, the same reference signs are allotted, and a description will be omitted.

Figure 6:
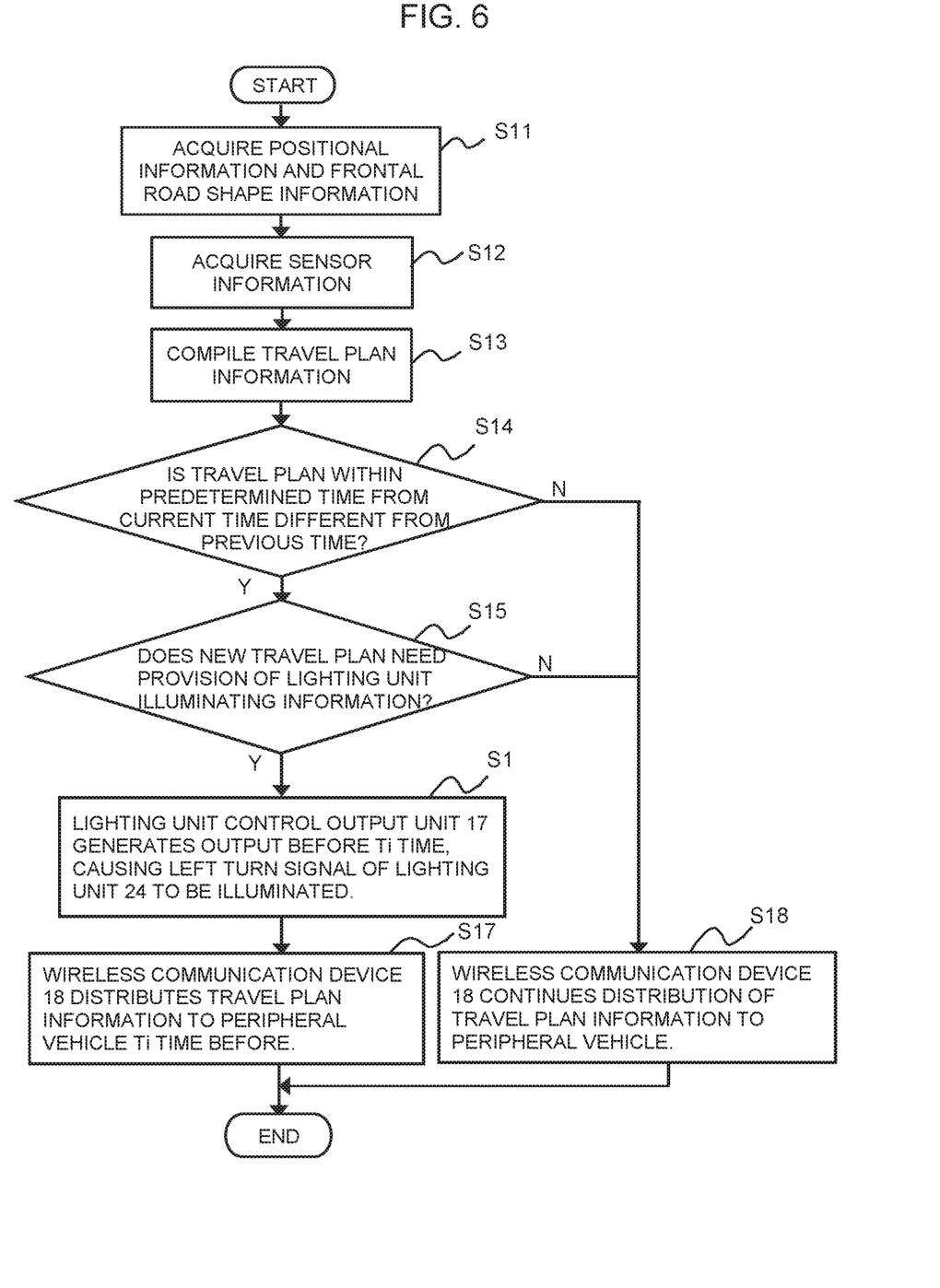
FIG. 6 is a flowchart for describing a process of the travel plan information distribution device according to the second embodiment.

Next, a process of the travel plan information distribution device 10 according to the second embodiment will be described, using FIG. 6.

Firstly, in the same way as in step S1 of the first embodiment, the travel plan information distribution device 10 acquires positional information and frontal road shape information from the positional information and frontal road shape information output device 21 (step S11), and furthermore, acquires vehicle operation information needed for control from the vehicle-mounted sensor group 22 (step S12).

Next, in step S13, the travel plan information compilation unit 14 compiles own vehicle travel plan information (t) for between several seconds and several tens of seconds ahead, based on the acquired positional information and frontal road shape information and the vehicle operation information.

The compilation of the travel plan information is controlled by the travel plan information distribution control unit 15 so as to be implemented in a cycle (approximately 10 to 20 milliseconds) shorter than a transmission cycle of the vehicle-mounted wireless communication device 18 at a normal time (approximately 100 milliseconds to 1,000 milliseconds).

Next, in step S14, the travel plan information distribution device 10 confirms whether or not details within the time Ti from the current time of the travel plan information (t) compiled in step S13 differ from those of travel plan information (t−1) transmitted the previous time.

Herein, when the travel plan information (t) differs from the travel plan information (t−1) transmitted the previous time (Y), the travel plan information distribution device 10 shifts to step S15, and determines whether the new travel plan necessitates providing a peripheral vehicle with lighting unit illuminating information. When it is determined in step S15 that information needs to be provided (Y), the travel plan information distribution device 10 shifts to step S16, and causes the lighting unit 24 to be illuminated. Subsequently, in step S17, an output of the travel plan information (t) is caused to be transmitted continuously to the vehicle-mounted wireless communication device 18 for a certain time in a cycle (20 milliseconds) shorter than the transmission cycle at a normal time (for example, transmitted ten times for 200 milliseconds continuously) by the travel plan information distribution control unit 15 of the travel plan information distribution device 10.

That is, a transmission process is continued for a certain time in a transmission cycle used when there is a change in plan.

Also, the vehicle-mounted wireless communication device 18 outputs the travel plan information input from the travel plan information distribution device 10 each time the travel plan information is input, using wireless communication.

That is, the cycle in which travel plan information is output from the vehicle-mounted wireless communication device 18 here is of the same value as the cycle in which travel plan information is input into the vehicle-mounted wireless communication device 18 from the travel plan information distribution device 10.

When the travel plan information (t) is the same as the travel plan information (t−1) transmitted the previous time in step S14 (N), and furthermore, when it is determined in the following step S15 that the new travel plan does not necessitate providing a peripheral vehicle with lighting unit illuminating information (N) even though there is a change in the travel plan in step S14, the travel plan information distribution device 10 shifts to step S18, and an output of the travel plan information (t) is caused to be transmitted continuously to the vehicle-mounted wireless communication device 18 for a certain time in a cycle (100 milliseconds) shorter than the transmission cycle at a normal time by the travel plan information distribution control unit 15 of the travel plan information distribution device 10, after which the travel plan information distribution device 10 ends the series of processes.

In this way, when there is a change in travel plan information effective in the near future among own vehicle travel plan information, the new travel plan information is continuously distributed for a constant time in a cycle shorter than a normal-time communication cycle, whereby, when the own vehicle attempts to make an emergency stop or the like, a peripheral vehicle can be notified of details thereof in a time shorter than that at a normal time, and safe automatic driving can be realized.

Also, by the frequency of communication being increased at only a necessary timing for a predetermined time from the point at which the own vehicle travel plan is changed, one vehicle wastefully occupying a communication bandwidth can be avoided even when multiple vehicles exist in nearby positions, such as with inter-vehicle communication, because of which communication congestion is reduced, and communication quality and stability can be improved.

That is, the stability of inter-vehicle communication improves, and safe automatic driving can be realized.

Although not shown in the heretofore described flowchart, the travel plan information distribution control unit 15 selects travel plan information from the peripheral vehicle 50 effective for the own vehicle received by the vehicle-mounted wireless communication device 18, and causes travel plan information of the peripheral vehicle to be displayed in the travel plan information display unit 23 and the lighting unit 24 via the travel plan information notification unit 16 and the lighting unit control output unit 17.

Herein, travel plan information of which the driver is notified is assumed to be travel plan information within an effective information provision time T_Available of the driver from the current time. When the effective information provision time T_Available is a time T1 in which notification of the travel plan information is carried out, a time T2 in which the driver recognizes the travel plan information after the notification, and a time T3 in which the driver responds to the travel plan, the effective information provision time T_Available is a time of a value equal to or greater than a time that is T1+T2+T3.

As there is a possibility of the driver failing to hear the travel plan information at this time, the effective information provision time T_Available may be T1+T2×N+T3 (note that N is the number of times the driver fails to hear the travel plan information).

Also, when the starting time of the travel plan information is ten minutes later, the driver cannot remain alert, because of which a value obtained by experiment or the like, such as three minutes before, may be adopted as T_Available.

Furthermore, travel plan information of which the driver is notified may be assumed to be only travel plan information that is within an effective information provision time T_Available of the driver from the current time, and which is effective with respect to a frontal lane in which the vehicle driven by the driver is traveling (for example, a case wherein an autonomous vehicle changes lane to the frontal lane, or an autonomous vehicle in the frontal lane decelerates).

In this case, the driver is notified of travel plan information when, for example, there is travel plan information regarding a lane change to a lane within 300 m ahead of an own vehicle position with the same lane link ID, based on frontal road map information and positional information in the positional information and frontal road shape information output device 21.

According to this kind of configuration, the driver no longer needs to pay more attention than necessary with respect to the own vehicle, because of which the driver can drive safely even when an autonomous vehicle and a non-autonomous vehicle are mixed together.

Third Embodiment

Figure 7:
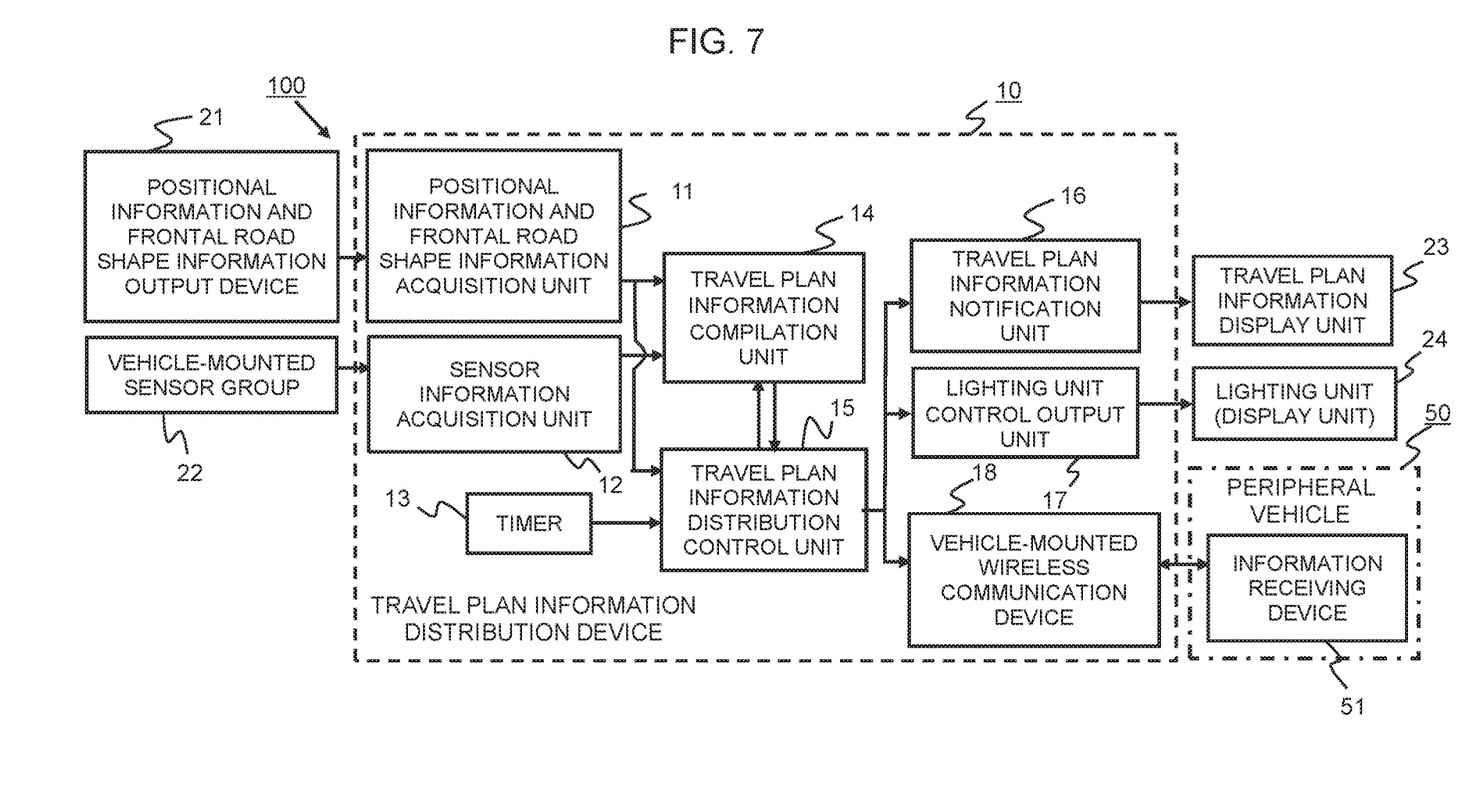
FIG. 7 is a block diagram showing an overall configuration of a travel plan information distribution system according to a third embodiment.

FIG. 7 is a block diagram showing an overall configuration of a travel plan information distribution system according to a third embodiment.

The third embodiment is an embodiment of a case wherein the travel plan information compilation unit 14 outputs only the scheduled travel path information of the information 4.

In the diagram, an output of the positional information and frontal road shape information acquisition unit 11 is supplied to the travel plan information distribution control unit 15, and as other configurations are substantially the same as in the first embodiment, identical reference signs are allotted to identical portions, and a description thereof will be omitted.

Based on this kind of configuration, the travel plan information distribution control unit 15 collates (maps) road map information for a periphery of the own vehicle acquired from the positional information and frontal road shape information acquisition unit 11 and scheduled travel path information from the travel plan information compilation unit 14 on a road map, and generates travel plan category information.

Figure 8:
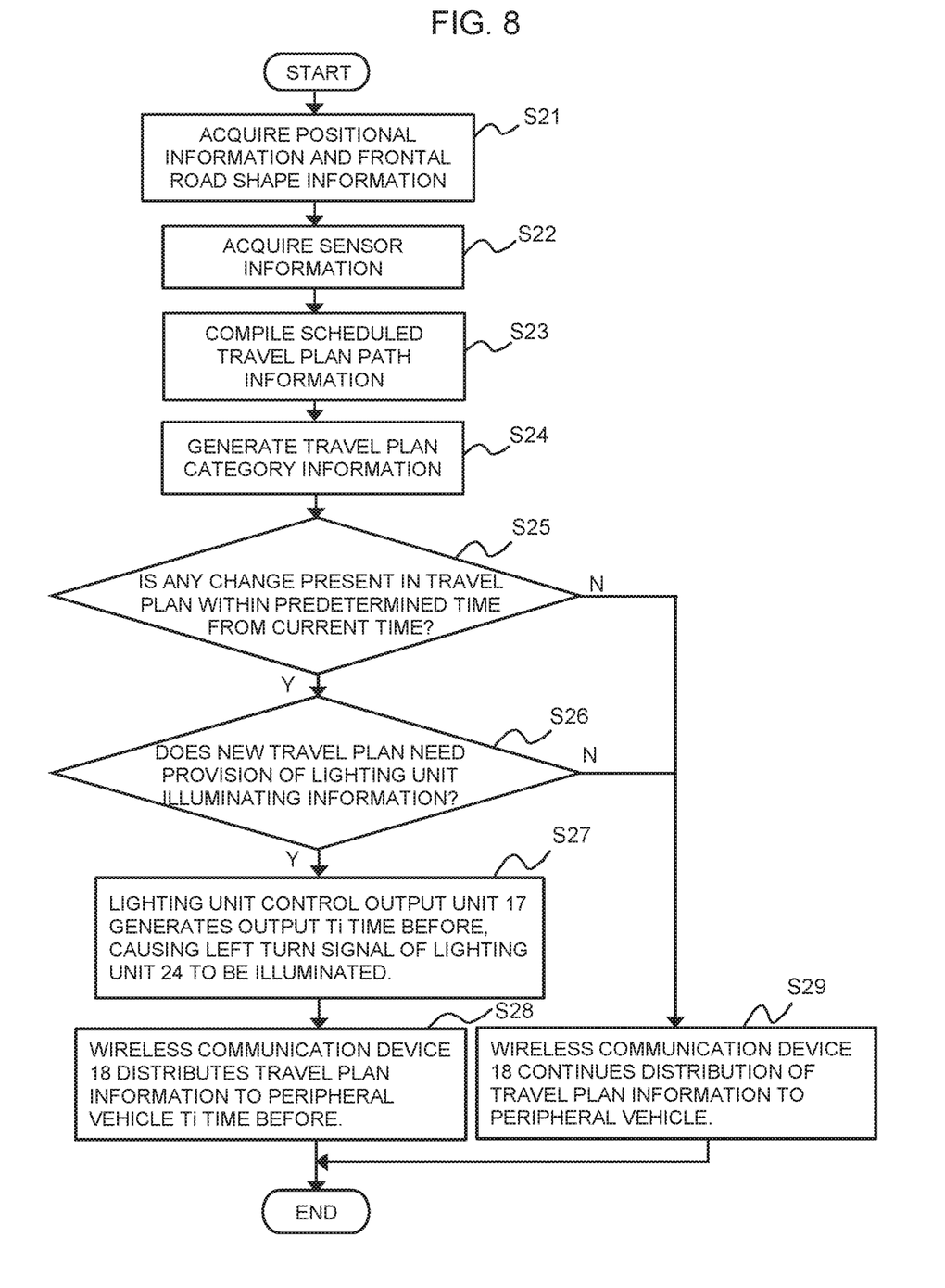
FIG. 8 is a flowchart for describing a process of the travel plan information distribution device according to the third embodiment.

Next, a process of the travel plan information distribution device 10 according to the third embodiment will be described, using FIG. 8.

Firstly, in the same way as in step S1 of the first embodiment, the travel plan information distribution device 10 acquires positional information and frontal road shape information from the positional information and frontal road shape information output device 21 (step S21), and furthermore, acquires vehicle operation information needed for control from the vehicle-mounted sensor group 22 (step S22).

Next, in step S23, the travel plan information compilation unit 14 compiles scheduled travel path information based on the acquired positional information and frontal road shape information and on the vehicle operation information, and inputs the scheduled travel path information into the travel plan information distribution control unit 15. The positional information and frontal road shape information is continuously input into the travel plan information distribution control unit 15 in a constant cycle (every 100 milliseconds), and the travel plan information distribution control unit 15 maps the scheduled travel path information from the travel plan information compilation unit 14 on a road map, and generates travel plan category information from the two items of information (step S24).

That is, the travel plan information distribution control unit 15 generates travel plan category information for "changing lane to the right" when the mapped travel path moves to a lane in a right-hand direction, and for "changing lane to the left" when the scheduled travel path moves to a lane in a left-hand direction, and when there is no movement to either a left-hand or a right-hand lane, the travel plan information distribution control unit 15 generates travel plan category information for "a constant speed", "accelerating", or "decelerating", using a traveling speed obtained from the scheduled travel path.

Herein, when a lane change completion position for "changing lane to the left" or "changing lane to the right" is assumed to be within a predetermined range (for example, within 30 cm.) from a position of the autonomous vehicle (a center of gravity or a central position of the vehicle) and a center of the lane that is a movement destination (a position in the absolute center of the lane), a position in which a value of a distance between the position of the autonomous vehicle and a central position of the lane in which the autonomous vehicle is traveling begins to increase to either the right or the left toward the lane change completion position is assumed to be a lane change starting position.

Also, as the scheduled travel path is expressed as times and positions of the own vehicle at the times, the speed can be calculated from an amount of positional movement per unit time.

For example, when the scheduled travel path information is such that the position of the autonomous vehicle at a time t is P(t), a distance traveled between P(t) and P(t−1) is L(t), and Δt=t−(t−1), a speed V(t) at the time t can be calculated as V(t)=L(t)/Δ(t).

Herein, when an acceleration determination threshold a and a deceleration determination threshold @ are newly defined, and a temporal change ΔV(t) in V(t)−V(t)−V(t−1), an average per unit time T (for example, three seconds) of ΔV(t) is t=T, and S(t)=ΣΔV(t)/T, t=0, (and) the travel plan information distribution control unit 15 determines the travel plan information category as "acceleration": S(t)>α, "constant speed": α<S(t)<β, and "deceleration": S(t)<β.

Even when traveling straight ahead, the speed of an autonomous vehicle is not such that the autonomous vehicle continuously travels at the same speed, but rather that there is a slight acceleration or deceleration for a short time, because of which the acceleration determination threshold a and the deceleration determination threshold R are thresholds for determining boundaries of acceleration and deceleration, wherein values obtained in advance by experiment or the like are utilized.

Next, continuing on from the heretofore described kind of process of step S24, the travel plan information distribution device 10 executes step S25 to step S29 in the same way as step S4 to step S8 in the first embodiment.

Even when the travel plan information compilation unit 14 outputs only scheduled travel path information, as heretofore described, a travel plan category information is compiled from the scheduled travel path information by the travel plan information distribution control unit 15, and the presence or otherwise of a change in the travel plan can be determined, because of which the travel plan information compilation unit 14 no longer needs to compile a travel plan category information.

There is a possibility of a compilation method and definitions of a travel plan category information compiled by the travel plan information compilation unit 14 (in this embodiment, in other words, definitions of a lane change starting position and completion position, the acceleration determination threshold a, the deceleration determination threshold β, and the like) differing for each autonomous vehicle model and maker. For example, a front autonomous vehicle transmits a travel plan category information of "decelerating" to a rear autonomous vehicle, and the front autonomous vehicle starts decelerating at a deceleration of 3.0 m/S² at the plan starting time, but as the rear autonomous vehicle assumes a deceleration of 1.0 m/S², a distance between the rear autonomous vehicle and the front autonomous vehicle cannot be sufficiently secured, and there is a possibility of colliding.

Also, there is a risk of an error occurring in that a notification and an operation differ, such as when a front autonomous vehicle actually changes lane to the left-hand lane after transmitting a travel plan category of "changing lane to the right".

That is, in the third embodiment, a rear autonomous vehicle that receives scheduled travel path information performs a role of determining how a front autonomous vehicle that is the transmission source of the scheduled travel path information will move, because of which an occurrence of the heretofore described kinds of problem can be restricted.

A configuration may also be such that a travel plan information compilation unit that compiles a travel plan of an autonomous vehicle is provided in a server device outside the autonomous vehicle, and the autonomous vehicle is notified of the compiled travel plan information via wide-area communication such as LTE (long term evolution).

In this case, the heretofore described time Td available for the own vehicle to suspend the travel plan is equal to or greater than a sum of a necessary communication time Te, needed for communication between the server device and the autonomous vehicle, and a processing time Tf, needed for compiling the travel plan information in the server device. That is, it is necessary that Td≥Te+Tf.

Although the present application is described in terms of exemplifying embodiments, the various features, aspects, and functions described in the embodiments are not limited in applicability to a particular embodiment, but instead can be applied, alone or in various combinations, to other embodiments.

It is therefore understood that numerous modifications that have not been exemplified can be devised without departing from the scope of the present application. For example, at least one constituent component may be modified, added, or eliminated.

REFERENCE SIGNS LIST

100: travel plan information distribution system, 10: travel plan information distribution device, 11: positional information and frontal road shape information acquisition unit, 12: sensor information acquisition unit, 13: timer, 14: travel plan information compilation unit, 15: travel plan information distribution control unit, 16: travel plan information notification unit, 17: lighting unit control output unit, 18: vehicle-mounted wireless communication device, 21: positional information and frontal road shape information output device, 22: vehicle-mounted sensor group, 23: travel plan information display unit, 24: lighting unit (display unit), 50: peripheral vehicle, 51: information receiving device, 52: travel plan information distribution device

The invention claimed is:

1. A travel plan information distribution system, comprising:
    a wireless communicator that carries out inter-vehicle communication with a peripheral vehicle;
    at least one processor configured to
        acquire positional information and frontal road shape information of an own vehicle;
        acquire sensor data output from a vehicle-mounted sensor group;
        compile travel plan information based on the positional information, the frontal road shape information, and the sensor data; and
        supply the travel plan information to a display;
        when a change is made to a scheduled driving operation with a specific starting time in the travel plan information, and the specific starting time falls within a predetermined time from a current time, control a light of the own vehicle to notify the peripheral vehicle about the change in the travel plan information prior to the specific starting time; and
        when the change is made to the scheduled driving operation with the specific starting time in the travel plan information, and the specific starting time falls outside the predetermined time from the current time, control the wireless communicator to transmit the change in the travel plan information to the peripheral vehicle at a normal transmission cycle.

2. The travel plan information distribution system according to claim 1, wherein,
    when a time needed to notify a peripheral vehicle or a driver of a new travel plan is Ta,
    a time needed for the peripheral vehicle to respond to the new travel plan is Tb,
    a time needed to notify a driver or a passenger of an own vehicle of the new travel plan is Tc, and
    a time needed for the driver to carry out an operation suspending the new travel plan is Td,
    the predetermined time is a total time calculated by Ta+Tb+Tc+Td.

3. The travel plan information distribution system according to claim 2, wherein when there is the change in the travel plan information, the at least one processor changes an illumination time interval of the light in accordance with a distance from a current position of the own vehicle at the current time, to a change starting position, or a time from the current time to the specific starting time.

4. The travel plan information distribution system according to claim 3, wherein, when there is the change in the travel plan information and the specific starting time falls within the predetermined time from the current time, the at least one processor controls the wireless communicator to transmit the change in the travel plan information to the peripheral vehicle at a transmission cycle shorter than the normal transmission cycle.

5. The travel plan information distribution system according to claim 3, wherein the at least one processor selects travel plan information to be distributed, and determines a distribution timing and a distribution cycle in accordance with the change in the travel plan information.

6. The travel plan information distribution system according to claim 2, wherein, when there is the change in the travel plan information and the specific starting time falls within the predetermined time from the current time, the at least one processor controls the wireless communicator to transmit the change in the travel plan information to the peripheral vehicle at a transmission cycle shorter than the normal transmission cycle.

7. The travel plan information distribution system according to claim 2, wherein the at least one processor selects the travel plan information to be distributed, and determines a distribution timing and a distribution cycle in accordance with the change in the travel plan information.

8. The travel plan information distribution system according to claim 1, wherein when there is the change in the travel plan information, the at least one processor changes an illumination time interval of the light in accordance with a distance from a current position of the own vehicle at the current time, to a change starting position, or a time from the current time to the specific starting time.

9. The travel plan information distribution system according to claim 8, wherein, when there is the change in the travel plan information and the specific starting time falls within the predetermined time from the current time, the at least one processor controls the wireless communicator to transmit the change in the travel plan information to the peripheral vehicle at a transmission cycle shorter than the normal transmission cycle.

10. The travel plan information distribution system according to claim 8, wherein the at least one processor selects the travel plan information to be distributed, and determines a distribution timing and a distribution cycle in accordance with the change in the travel plan information.

11. The travel plan information according to claim 1, wherein, when there is a change in travel plan information for a certain time ahead from a current time, the at least one processor is further configured to control the wireless communicator to transmit the changed travel plan information in a predetermined cycle.

12. The travel plan information distribution system according to claim 1, wherein the at least one processor selects the travel plan information to be distributed, and determines a distribution timing and a distribution cycle in accordance with the change in the travel plan information.

13. A travel plan information distribution system, comprising:
a wireless communicator that carries out inter-vehicle communication with a peripheral vehicle;
at least one processor configured to:
acquire positional information and frontal road shape information of an own vehicle;
acquire sensor data from a vehicle-mounted sensor group;
compile travel plan information based on the positional information, the frontal road shape, and the sensor data;
supply the travel plan information to a display;
when a change is made to a scheduled driving operation with a specific starting time in the travel plan information, and the specific starting time falls within a predetermined time from a current time, control a light of the own vehicle to notify the peripheral vehicle about the change in the travel plan information prior to the specific starting time, and controls the wireless communicator to transmit the change in the travel plan information to the peripheral vehicle at a transmission cycle shorter than a normal transmission cycle; and
when the change is made to the scheduled driving operation with the specific starting time in the travel plan information, and the specific starting time falls outside the predetermined time from the current time, control the wireless communicator to transmit the change in the travel plan information to the peripheral vehicle at the normal transmission cycle.

14. A travel plan information distribution system, comprising:
a wireless communicator that carries out inter-vehicle communication with a peripheral vehicle;
at least one processor configured to:
acquire positional information and frontal road shape information of an own vehicle;
acquire sensor data output from a vehicle-mounted sensor group;
compile travel plan information based on the positional information, the frontal road shape information, and the sensor data;
supply the travel plan information to a display;
wherein the travel plan information includes scheduled travel path information that represents a path along which the own vehicle is to move, and travel plan category information including a lane change based on the scheduled travel path information,
when a change is made to a scheduled driving operation with a specific starting time in the travel plan information, and the specific starting time falls within a predetermined time from a current time, control a light of the own vehicle to notify the peripheral vehicle about the change in the travel plan information prior to the specific starting time,
when the change is made to the scheduled driving operation with the specific starting time in the travel plan information, and the specific starting time falls outside the predetermined time from the current time, control the wireless communicator to transmit the change in the travel plan information to the peripheral vehicle at a normal transmission cycle, and
when the scheduled driving operation is for conducting the lane change in the travel plan information.

* * * * *